United States Patent [19]

Geisreiter

[11] Patent Number: 5,056,815
[45] Date of Patent: Oct. 15, 1991

[54] ARRANGEMENT FOR AN AIRBAG GAS GENERATOR

[75] Inventor: Christian Geisreiter, Munich, Fed. Rep. of Germany

[73] Assignee: Bayern-Chemie, Gesellschaft fur flugchemische Antriebe mbH GmbH, Fed. Rep. of Germany

[21] Appl. No.: 542,002

[22] Filed: Jun. 22, 1990

[30] Foreign Application Priority Data

Jul. 25, 1989 [DE] Fed. Rep. of Germany ....... 3924500

[51] Int. Cl.$^5$ ............................................. B60R 21/26
[52] U.S. Cl. .................................... 280/736; 280/741
[58] Field of Search ......................... 280/736, 740, 741

[56] References Cited

U.S. PATENT DOCUMENTS

| 4,200,615 | 4/1980 | Hamilton et al. | 422/166 |
| 4,561,675 | 12/1985 | Adams et al. | 280/734 |

FOREIGN PATENT DOCUMENTS

| 2518460 | 3/1977 | Fed. Rep. of Germany . |
| 3425836 | 1/1986 | Fed. Rep. of Germany . |
| 3924500 | 12/1990 | Fed. Rep. of Germany . |
| 229739 | 9/1989 | Japan ................................. 280/736 |

Primary Examiner—Kenneth R. Rice
Attorney, Agent, or Firm—Evenson, Wands, Edwards, Lenahan & McKeown

[57] ABSTRACT

The invention relates to a temperature-dependent control of the gas pressure supplied by the gas generator.

11 Claims, 1 Drawing Sheet

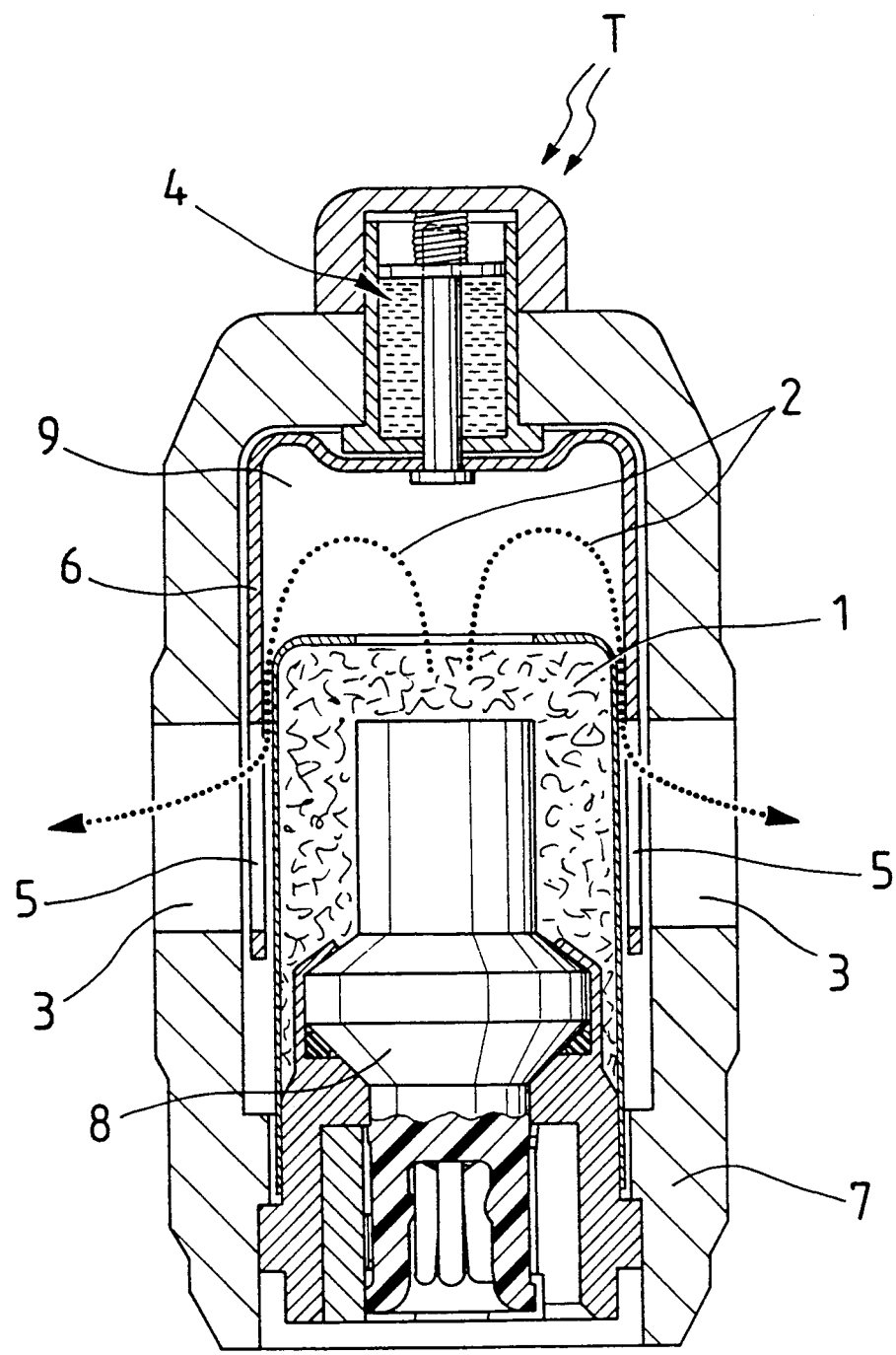

ARRANGEMENT FOR AN AIRBAG GAS GENERATOR

BACKGROUND AND SUMMARY OF THE INVENTION

The invention relates to an arrangement for a gas generator of a motor vehicle occupant protection system, the primary charge of which is arranged in a housing which has at least one opening leading to the housing of the gas-generating propulsion charge.

Protection systems of this type, as air cushions, are known under the name of airbags. The U.S. Pat. No. 4,561,675 describes a gas generator for this purpose which has a central chamber for the primary charge which, by way of openings provided at the circumference of the chamber, is connected with a surrounding additional chamber in which the gas-generating propellant charge is disposed. However, a control of the gas production which depends on the respective ambient temperature is not provided so that by means of this generator, a charging time and a charging ratio of the airbag can only be achieved which is dependent on the ambient temperature.

It is an object of the invention to control the produceable gas volume as a function of the ambient temperature.

This object is achieved according to the invention in that the throughput of the flame jet generated by the primary charge through the opening between the primary charge chamber and the propulsion charge chamber can be adjusted by means of temperature-dependent control elements as a function of the ambient temperature T. Advantageous developments of preferred embodiments of the invention are described below.

The invention is based on the recognition that the burn-up action of the gas-generating propulsion charge is a function of the gas pressure of the primary charge and can therefore be controlled.

It is a special advantage of the control of the propulsion charge according to the invention that the temperature dependence of the gas generator is reduced considerably, whereby the filling ratio of the airbag becomes considerably more uniform within the whole temperature range experienced in use. In addition, the pressure of the propulsion charge chamber is lowered in the range of high temperatures, thereby increasing the operational reliability.

Reference is made to related commonly assigned patent applications Ser. No. 07/526,704, filed May 22, 1990, (based on German Patent Application P 39 21 472.9-21, filed in Germany on June 30, 1989 and German Patent Application P 39 21 473.7-21, filed in Germany on June 30, 1989); and Ser. No. 07/541,954, filed June 22, 1990, (based on German Utility Model No. G 89 09 626.6, filed in Germany on Aug. 11, 1989.

Other objects, advantages and novel features of the present invention will become apparent from the following detailed description of the invention when considered in conjunction with the accompanying drawings.

BRIEF DESCRIPTION OF THE DRAWINGS

The single drawing figure is a schematic sectional view of an airbag gas generator constructed according to a preferred embodiment of the invention.

DETAILED DESCRIPTION OF THE DRAWINGS

The sole figure of the drawing is a schematically simplified sectional view of a housing 7 of a primary charge 1 of a gas generator. In a known manner, the primary charge is initiated by means of an electric igniter 8. The flame jet 2 generated by the primary charge 1 escapes, by way of openings 3, into the chamber—which is not shown—of the propulsion charge which radially surrounds the housing 7 of the primary charge. Inside the chamber 9 formed by the housing 7, a sleeve-shaped screen 6 is arranged which is provided with bores 5. This screen is connected with a temperature-dependent control element 4 which, in the embodiment shown, is constructed as a thermostat. Other control elements, such as bimetallic or memory-metallic springs or thermohydraulic drives are known and may be used according to other contemplated embodiments of the invention.

By means of the control element 4, the screen 6 is displaced with respect to the openings 3 as a function of the ambient temperature T. When the temperatures are very high, the openings 3 are completely open; the lower the ambient temperature T, the smaller the effective opening 3 and therefore the throughput of the flame jet 2. The expansion volume of the chamber 9 also becomes continuously smaller upon lowering of the screen 6 by control element 4. The pressure of the gas flow 2 leaving the housing 7 rises inversely proportionally. As a result, the burn-up action of the gas-generating propulsion charge is controlled as follows: at low ambient temperatures, the propulsion charge which, on the basis of its nature, produces less gas at this temperature, is more intensely excited by the higher gas pressure of the flame jet of the primary charge; at high ambient temperatures, the propulsion charge generates more pressure anyhow and is therefore not initiated as intensely as a result of the fact that the gas pressure of the flame jet 2 is lower because of the large opening 3. Thus, the fluctuating range of the gas pressure supplied by the propulsion charge is reduced considerably within the whole operational temperature range of $-30° C. < T < +85° C.$ Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for a gas generator of a motor vehicle occupant protection system, the primary charge of which is arranged in a housing which has at least one opening leading to the housing of the gas-generating propulsion charge, wherein the throughput of a flame jet generated by the primary charge through the at least one opening is automatically adjusted by means of temperature-dependent control elements as a function of the ambient temperature T.

2. An arrangement for a gas generator according to claim 1, wherein the throughput of the flame jet is low at a low ambient temperature ($T \sim -30° C.$) and rises approximately linearly with an increasing ambient temperature ($-30° C. < T < +85° C.$).

3. An arrangement for a gas generator according to claim 1, wherein the control element is equipped with a screen which can be displaced in front of the at least one opening.

4. An arrangement for a gas generator according to claim 2, wherein the control element is equipped with a screen which can be displaced in front of the at least one opening.

5. An arrangement for a gas generator according to claim 1, wherein the control element is moved by a driving medium which changes one of: its shape, length and volume, as a function of ambient temperature.

6. An arrangement for a gas generator according to claim 2, wherein the control element is moved by a driving medium which changes one of: its shape, length and volume, as a function of ambient temperature.

7. An arrangement for a gas generator according to claim 3, wherein the control element is moved by a driving medium which changes one of: its shape, length and volume, as a function of ambient temperature.

8. An arrangement for a gas generator according to claim 4, wherein the control element is moved by a driving medium which changes one of: its shape, length and volume, as a function of ambient temperature.

9. An arrangement for a gas generator according to claim 3, wherein the screen includes a first part for controlling the at least one opening and a second part defining a variable volume chamber for the primary charge gas outlet.

10. An arrangement for a gas generator according to claim 9, wherein the control element operates to move the screen toward a position simultaneously decreasing the volume of the chamber and the size of the at least one opening in response to decreases in ambient temperature.

11. An arrangement for a gas generator of a motor vehicle occupant protection system comprising:
- a primary charge arranged in a first housing;
- a gas generating propulsion charge arranged in a second housing;
- at least one opening between said first housing and said second housing whereby a flame jet generated by said primary charge may flow from said first housing to said second housing; and
- a temperature dependent control element adapted to adjust a throughput of said flame jet generated by said primary charge through said opening, as a function of ambient temperature in the operating environment of said gas generator.

* * * * *